United States Patent [19]

Isaacman

[11] Patent Number: 4,859,990

[45] Date of Patent: Aug. 22, 1989

[54] ELECTRICALLY PROGRAMMABLE TRANSCEIVER SECURITY SYSTEM AND INTEGRATED CIRCUIT

[75] Inventor: Marvin Isaacman, Los Angeles, Calif.

[73] Assignee: Linear Corporation, Carlsbad, Calif.

[21] Appl. No.: 39,577

[22] Filed: Apr. 15, 1987

[51] Int. Cl.[4] .......................... G08B 1/08; H04Q 7/00

[52] U.S. Cl. .................................... 340/539; 340/531; 340/825.44; 340/825.5

[58] Field of Search .................... 340/539, 531, 825.14, 340/825.2, 825.44, 825.5

[56] References Cited

U.S. PATENT DOCUMENTS

| | | | |
|---|---|---|---|
| 3,579,221 | 5/1971 | Ashley et al. | 340/539 |
| 4,296,408 | 10/1981 | Neuringer | 340/539 |
| 4,422,071 | 12/1983 | de Graaf | 340/825.44 |
| 4,442,426 | 4/1984 | Heuschmann et al. | 340/539 |
| 4,535,333 | 8/1985 | Twardowski | 340/825.72 |
| 4,568,930 | 2/1986 | Livingston et al. | 340/825.5 |

*Primary Examiner*—Donnie L. Crosland
*Attorney, Agent, or Firm*—Ladas & Parry

[57] ABSTRACT

An electrically programmable security system includes a receiver responsive to particular radio frequency signals which include a predetermined digital code encoded on the radio frequency signal. The receiver generates a control signal upon detecting the presence of the encoded radio frequency signal. The receiver also includes a circuit for digitally communicating the predetermined digital code on a communication link. A transmitter includes a memory for storing a digital code and a circuit for generating a radio frequency signal at the radio frequency to which said receiver is responsive. The radio frequency signal generated by the transmitter is encoded with the digital code stored in the memory. The transmitter further includes a circuit for coupling with the communication link and a circuit for inputting the predetermined digital code from the receiver unit communicated on the communication link into the memory when the communication link is coupled to the coupling circuit.

20 Claims, 13 Drawing Sheets

FIG. 1
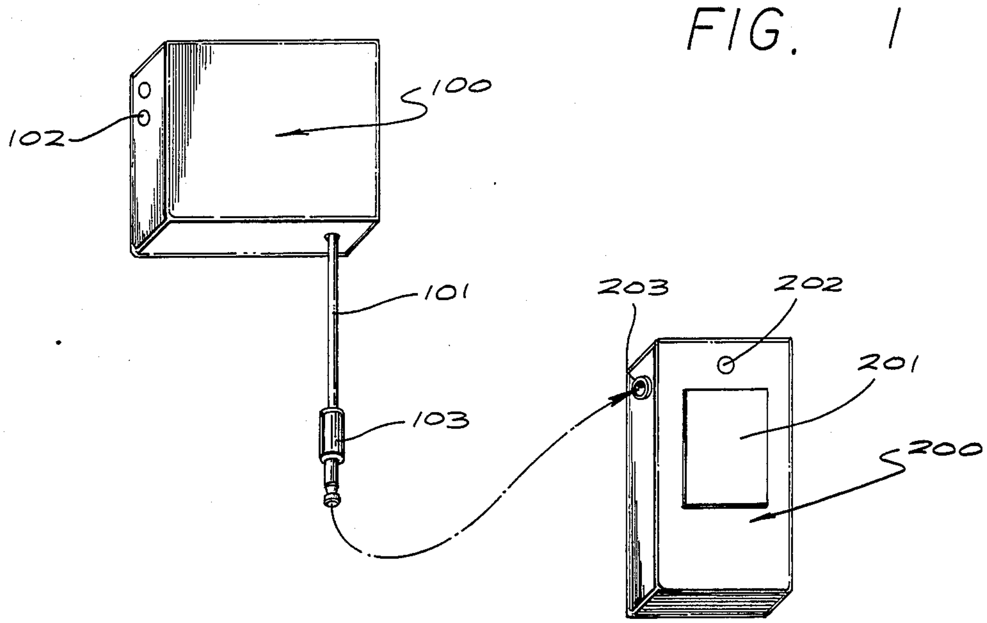
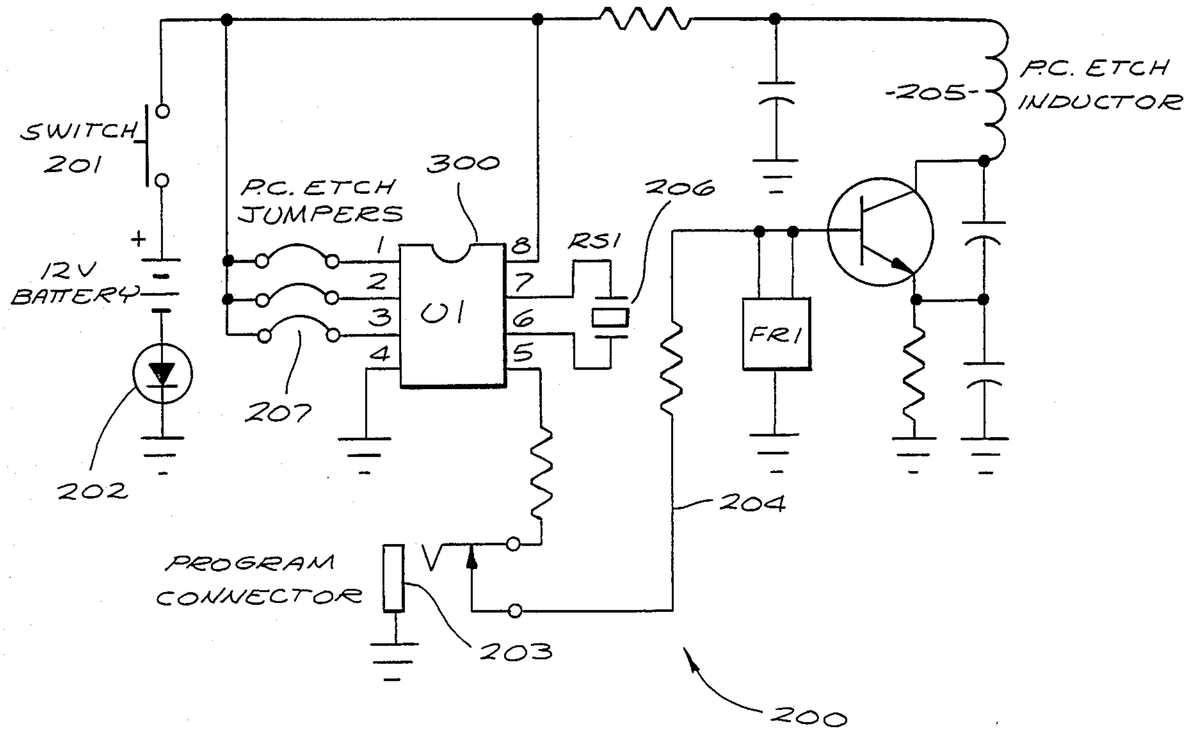
FIG. 2

STATE MAP

FIG. 7C(1)
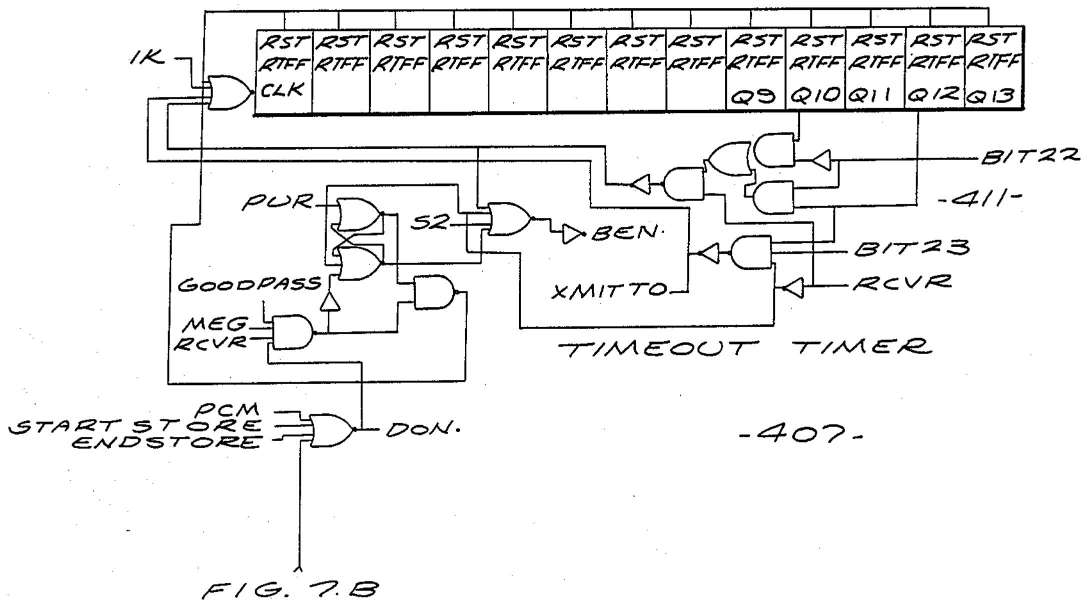
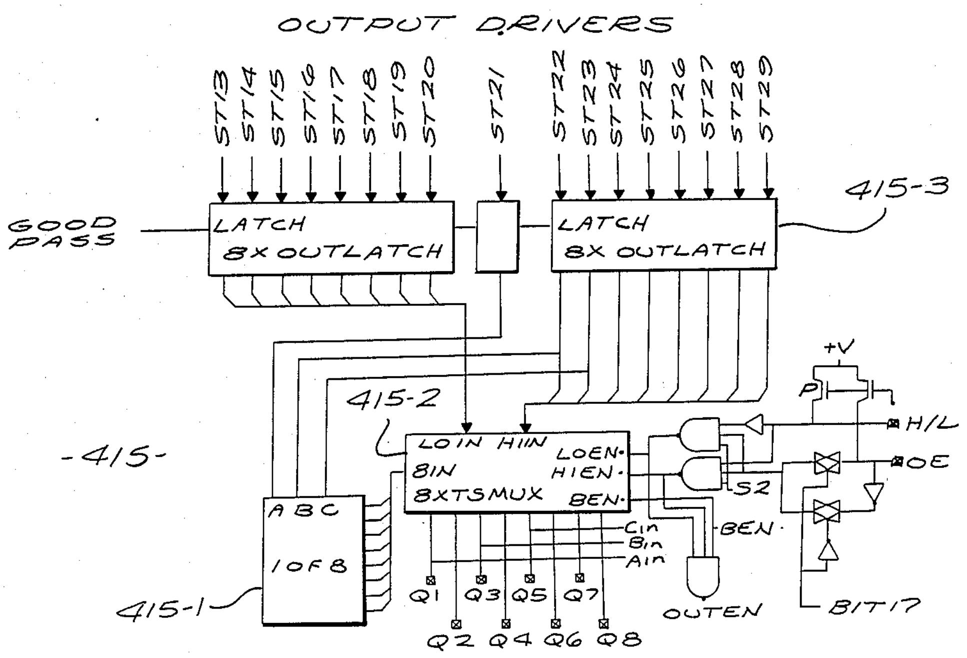

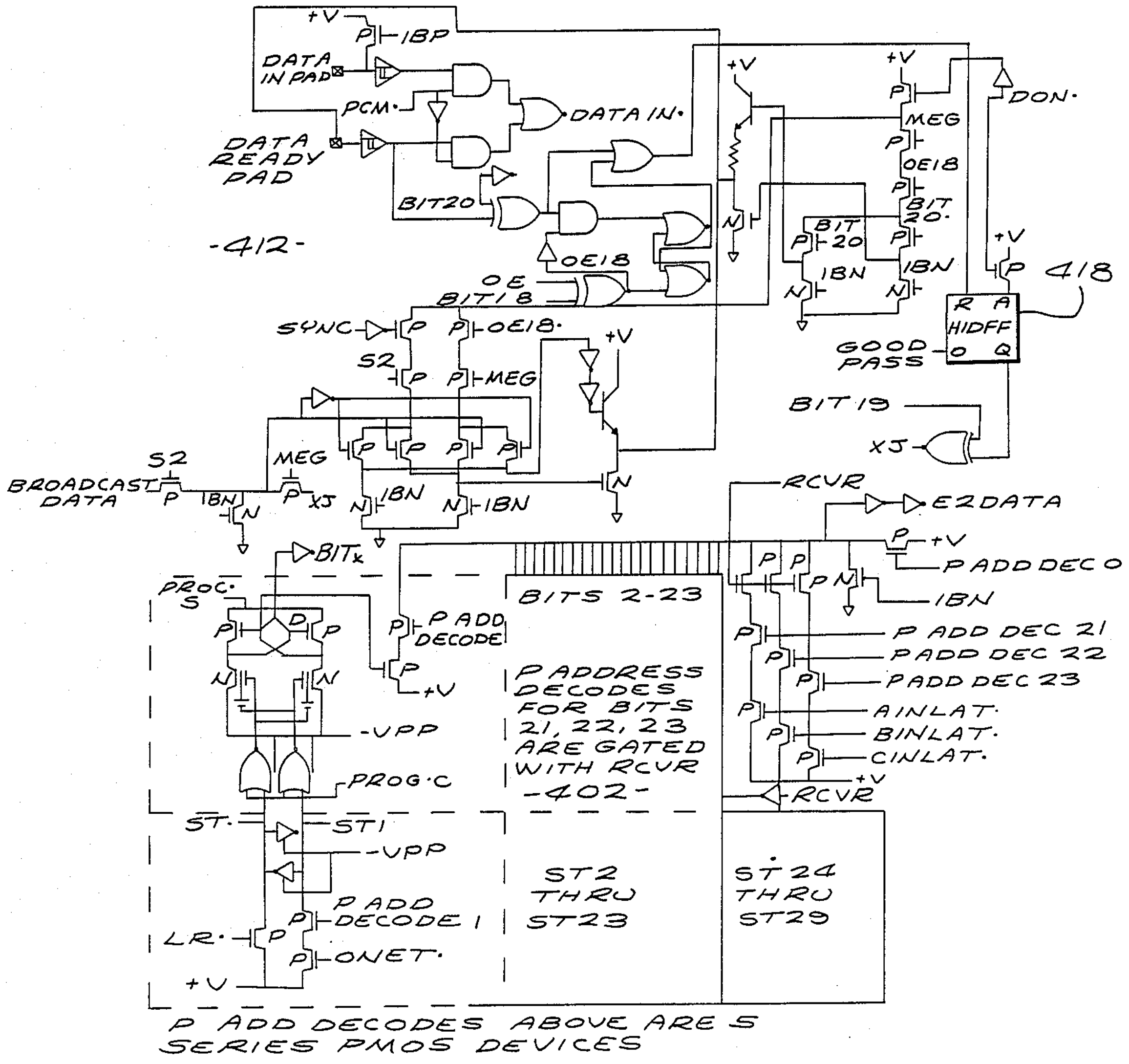
FIG. 7C(2)

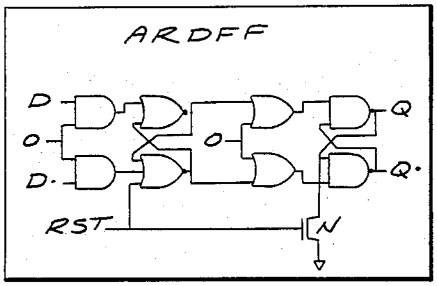
FIG. 8(1)
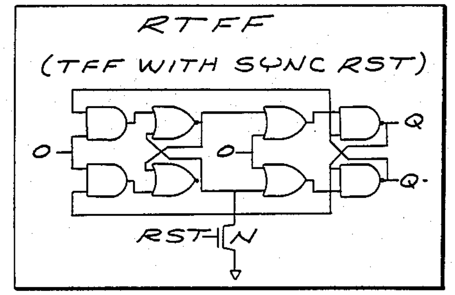
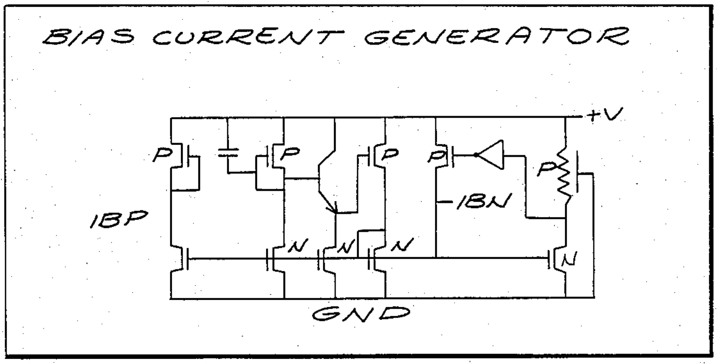
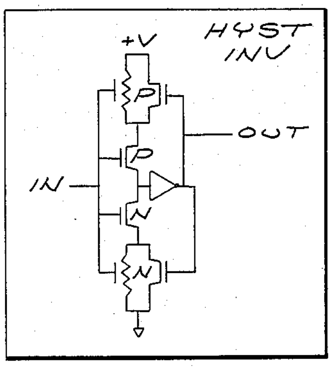
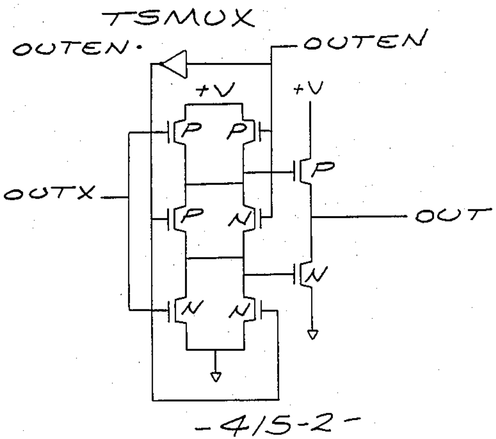
-415-2-

ELECTRICALLY PROGRAMMABLE TRANSCEIVER SECURITY SYSTEM AND INTEGRATED CIRCUIT

BACKGROUND OF THE INVENTION

Electronic security systems are well known in the prior art. Such security systems are typically used to control access through locked doors and the like to a particular area or room in a building. Such security systems are frequently used in industrial applications to limit access to a particular area only to authorized individuals. Security systems are also frequently used in both commercial and non-commercial applications. An example of a non-commercial application are the security systems which are frequently used in connection with garage door openers, gate controllers and door controllers in and around the home.

Typically, the security systems comprise a receiver which is responsive to an encoded radio frequency signal and a transmitter which is capable of transmitting the encoded radio frequency signal. In both the transmitter and the receiver, known in the prior art, the encoding of the radio frequency signal is controlled by manually flipping switches. Due to the small size of the transmitter units (they are usually hand held) and due to the fact that usually eight to sixteen switches are used to provide a sufficient number of different possible codes (for security purposes), the switches tend to be quite small in size. Generally speaking, identical switches are found in the receiver unit. Thus, in the prior art, it was necessary for a home owner (or other user of the security system) to manually flip the switches in both the receiver and hand held transmitter units to the identical code in order to "program" the devices.

These prior art techniques have several disadvantages. First, home owners and other users not infrequently neglect to "program" their transmitters and receivers (i.e., flip the switches to some code) due to a perceived complexity in carrying out the programming and, therefore, the units, as installed, are essentially unprogrammed. Second, the code can be easily read by third parties who are lent the hand held transmitter units (usually, all one must do to read the code is to open the case of the transmitter, which is easy to do since the case must be opened to change the unit's battery, and then note the position of the switches). Therefore, the security of the devices can be relatively easily breached.

There is a need, therefore, for security devices which can be easily programmed with a security code but which are relatively secure in concealing the security code from unauthorized parties.

BRIEF DESCRIPTION OF THE INVENTION

The invention provides, in broad terms, an electrically programmable security system which has a receiver unit and one or more transmitter units. The receiver unit is usually located in a secure area, such as inside a building, and is responsive to a radio frequency signal which is encoded with a security code. The receiver also includes a circuit for outputting the security code digitally on a wire or cable. Each transmitter unit includes a memory for storing the security code and means for updating the code stored in the memory when the transmitter unit is physically connected to the receiver unit by the aforementioned wire or cable.

BRIEF DESCRIPTION OF THE DRAWING

The novel features which are believed to be characteristic of the invention are set forth in the appended claims. The invention itself, however, both as to its construction and its method of operation and use, together with the objects and features thereof, will be best understood from the following detailed description when read in conjunction with the accompanying drawing, wherein:

FIG. 1 is a representational view of the external appearance of a hand-held transmitter unit and a receiver unit;

FIG. 2 is a schematic diagram of the circuit which is preferably used in the transmitter unit;

FIGS. 7*a*–7*d* provide a logic diagram of the integrated circuit; and

DETAILED DESCRIPTION OF THE INVENTION

Receiver and Transmitter Units

Figure 3:
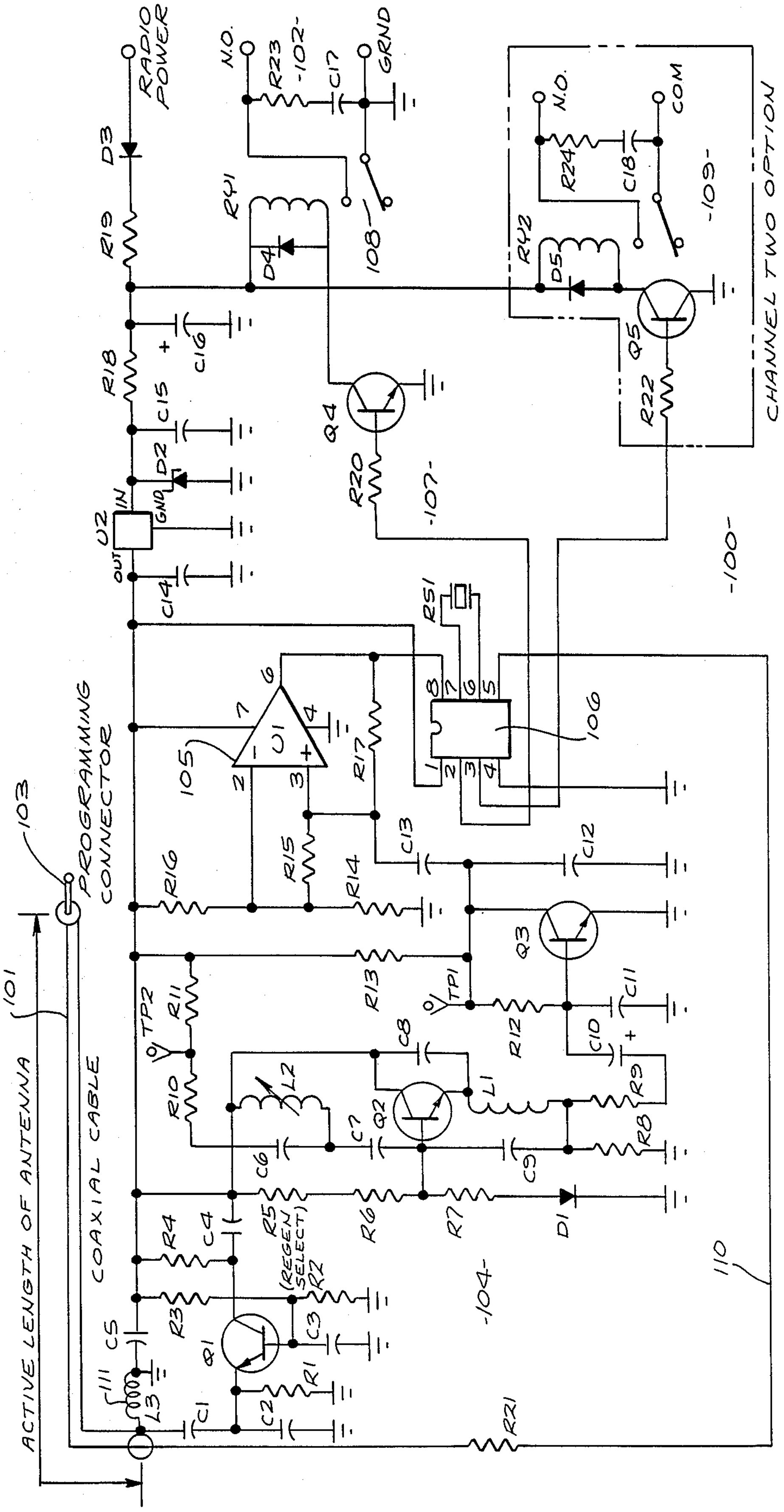
FIG. 3 is a schematic diagram of the circuit which is preferably used in the receiver unit.

Referring to FIG. 1, there is shown a receiver unit 100 and a transmitter unit 200. The transmitter unit has a push button 201 which, when depressed, causes the transmitter to generate a radio frequency signal which is encoded with a security code. The receiver unit 100 picks up the transmitted radio frequency signal by an antenna 101 and if the security code transmitted by the transmitter unit 200 matches the security code stored in the receiver unit 100, the receiver unit responds by generating a command signal which may be used to close a relay, for example, the contacts of which may be connected to the connector 102. This connector can be wired to a garage door lifting/closing device, a gate lifting/closing device or to an electronic lock.

The security code is preferably stored in a semiconductor memory in both the transmitter and receiver units so that the security code cannot be read by prying eyes. The semiconductor memory is preferably of the Non-Volatile Random Access Memory (NVRAM) type device so that the security code is changeable yet is relatively permanent. NVRAM devices do not lose their contents when power is disconnected.

Figure 7A:
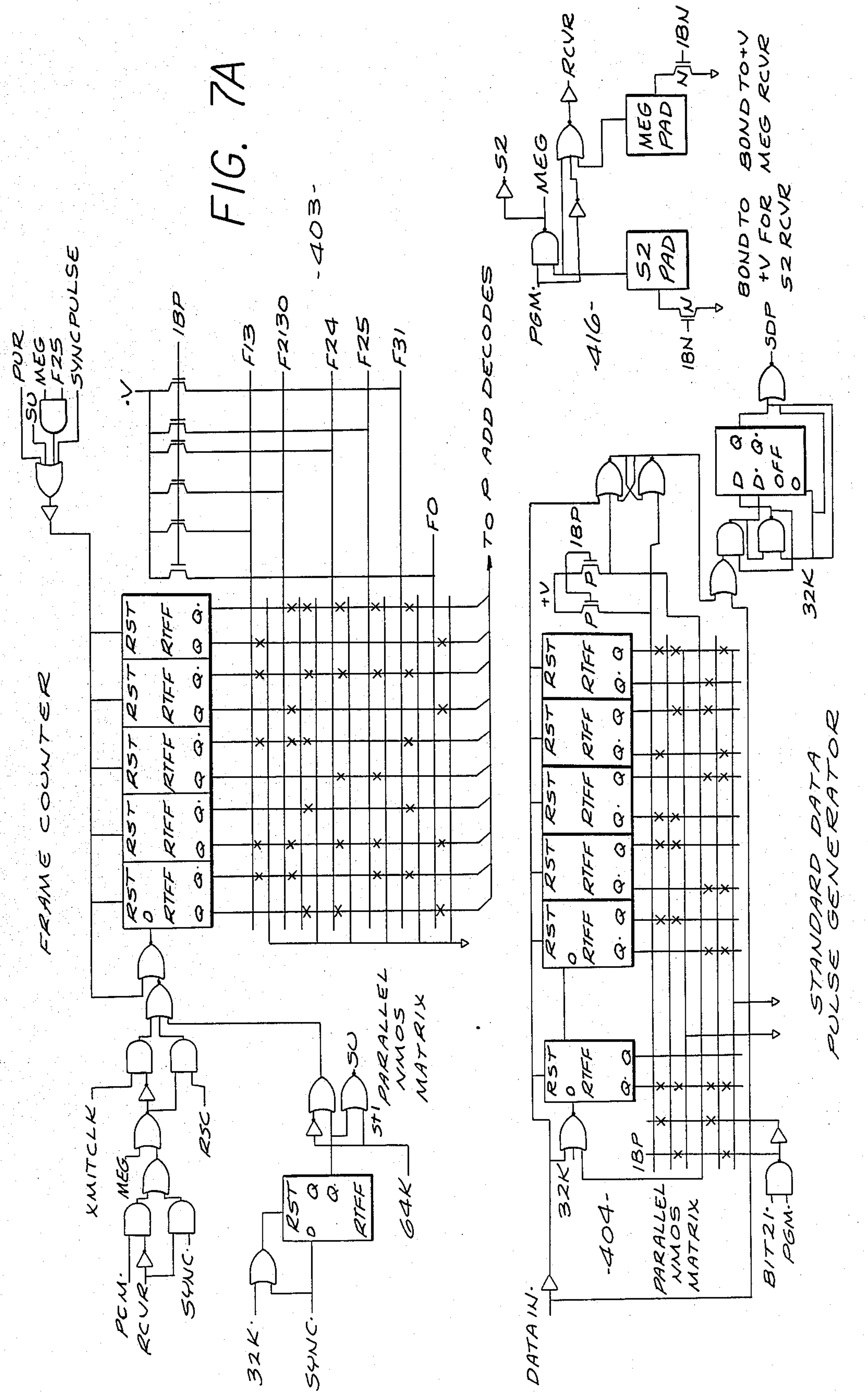
Figure 7B:
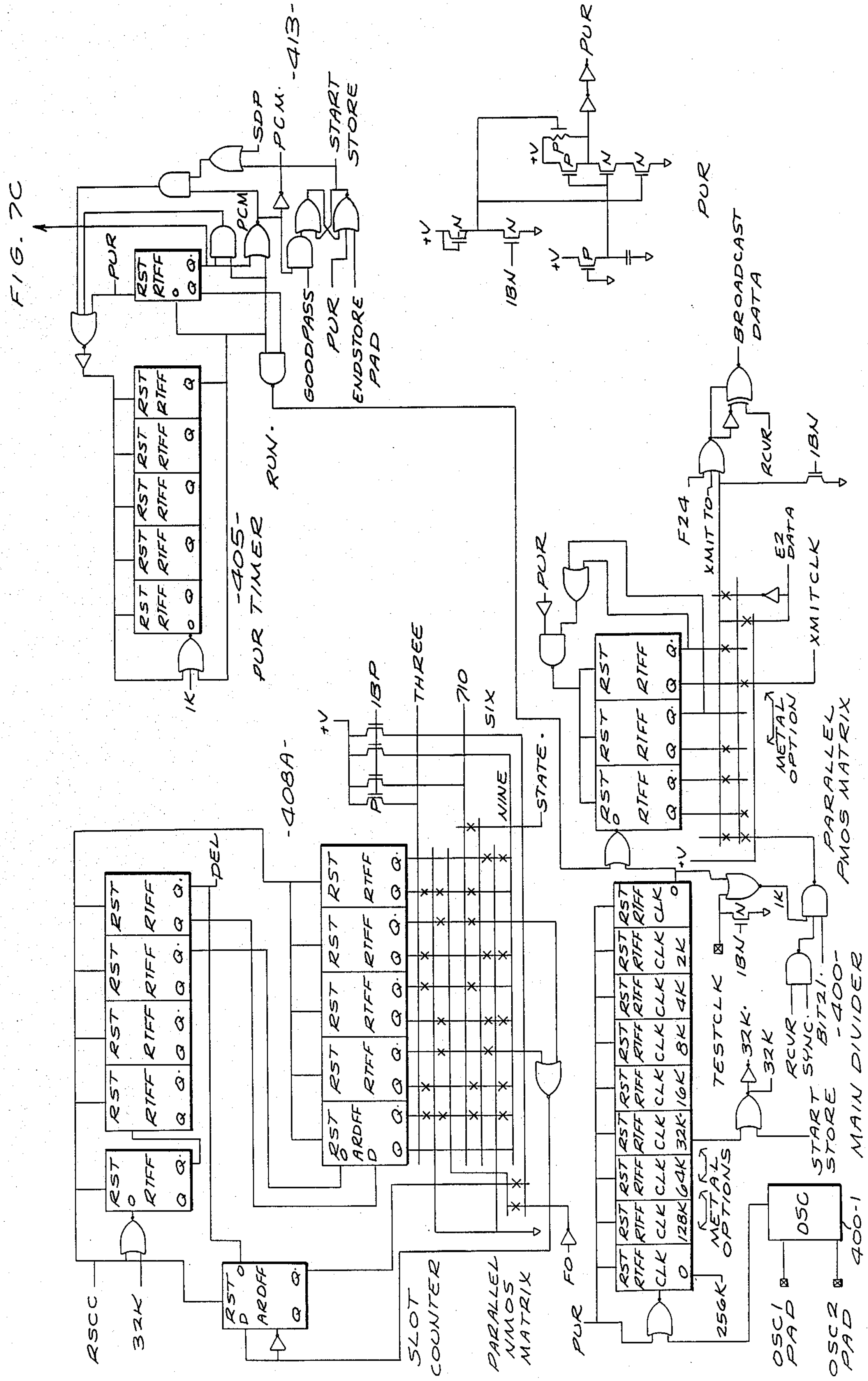
Figure 7D:
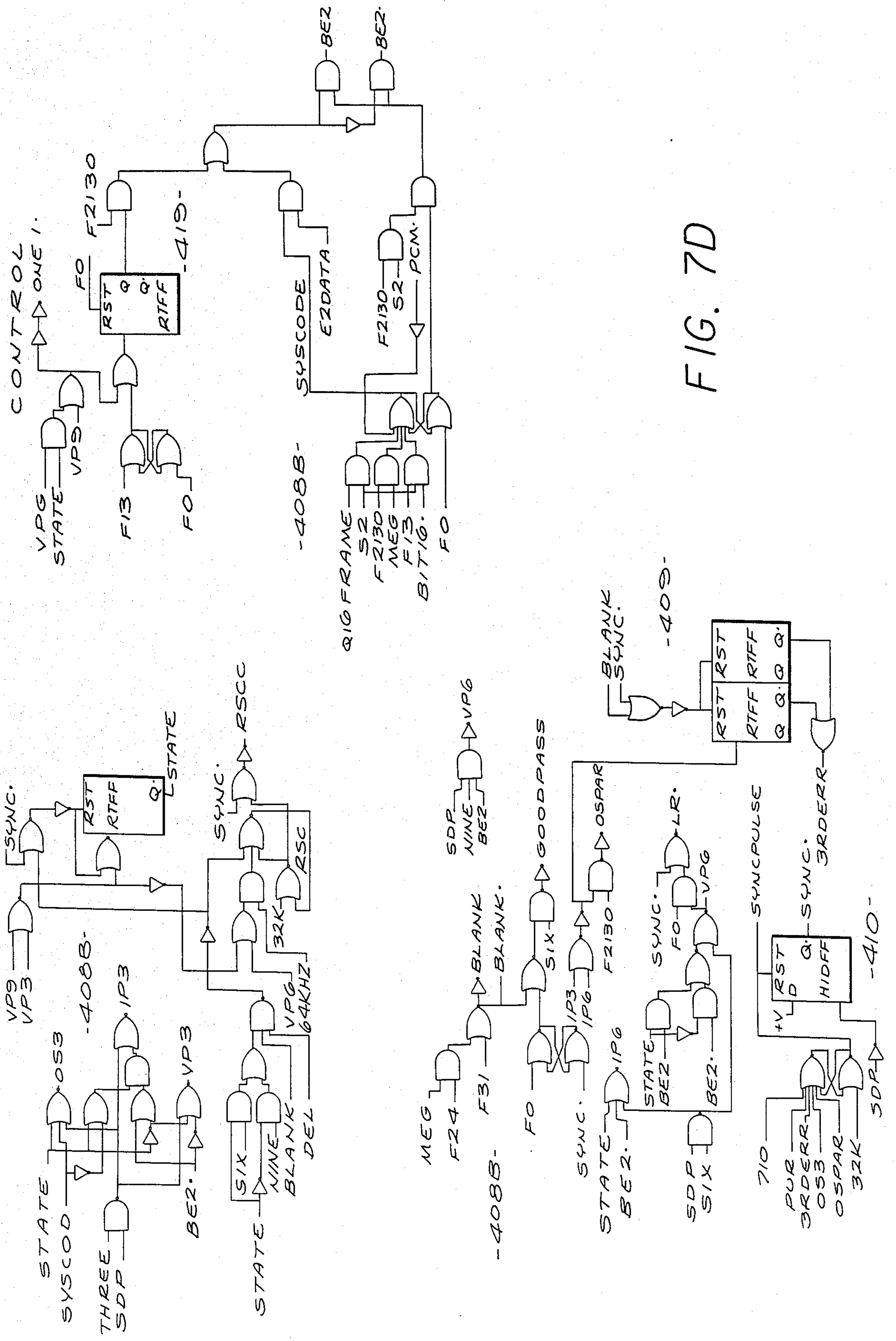

Antenna 101 preferably serves another purpose and, indeed, in the embodiment depicted, antenna 101 is formed by the shield of a coaxial cable which is connected to a conventional miniature jack 103. The receiver unit continuously detects for the presence of a radio frequency signal with the encoded security code encoded therein and, at the same time, continuously outputs the security code digitally (that is to say, not as a radio frequency signal, but rather as a conventional digital signal which is not intended to be irradiated) on coaxial cable 101. When jack 103 is mated to a corresponding connector 203 on the transmitter unit 200, the digital signal is directly coupled from the receiver unit to the transmitter unit. Transmitter unit 200 is preferably arranged so as to first test for the presence of a signal at connector 203 before transmitting the radio frequency signal with the encoded security code stored in the memory of the transmitter 200. If a signal is detected at connector 203 when pushbutton 201 is initially depressed, transmitter unit 200 is arranged to load its NVRAM (element 402 in FIGS. 4 and 7*c*) with the security code outputted on cable 101.

In this way, it is very easy to program a transmitter unit 200 to match the code to which the receiving unit 100 is responsive. All one must do is to bring the transmitter 200 in the physical vicinity of the receiver unit 100, connect the two together by means of cable 101, jack 103 and connector 203 and then depress pushbutton 201. Since the code is stored in a NVRAM within transmitter unit 200 (as will be seen, it is also stored in a NVRAM memory within receiver unit 100) the code cannot be easily deciphered suoh as it could be done with prior art devices by simply opening the case of the transmitter or receiver units and viewing the positions of the switches used in the prior art to set the security code.

Transmitter Unit Schematic

Turning now to FIG. 2, there is shown a schematic of a typical transmitting unit 200. As can be seen, depressing switch 201 energizes the circuit via the twelve volt battery which is preferably wired in series with a light emitting diode 202 which lights when switch 201 is depressed so that the user thereof will know the system is operational. The battery voltage is applied to integrated circuit 300 which will be subsequently described with reference to FIGS. 4, 5, 6, 7A through 7D, and 8. If IC 300 is not being programmed, then it outputs its digital code on pin 5 thereof which is connected via connector 203 and line 204 to a colpits oscillator 205 which transmits the encoded radio frequency signal from its inductor. The security code is preferably encoded using the well-known Pulse Position Modulation (PPM) encoding technique.

Preferably, the IC 300 outputs a digital code which is a function not only of a digital security code stored in the NVRAM 402 (which, as will be seen, is preferably within IC 300), but is also a function of a device code which may be effected by either throwing switches or by using jumpers 207. In the circuit of FIG. 2, such jumpers are shown at 207 and since there are three such jumpers, those skilled in the art will appreciate that this provides up to eight possible device codes.

As will be seen, IC 300 is capable of storing a twenty bit security code, thereby providing over one million different possible security codes. For each security code, there are eight possible device codes, the function of which will be described subsequently.

The Receiver Unit Schematic

Figure 4:
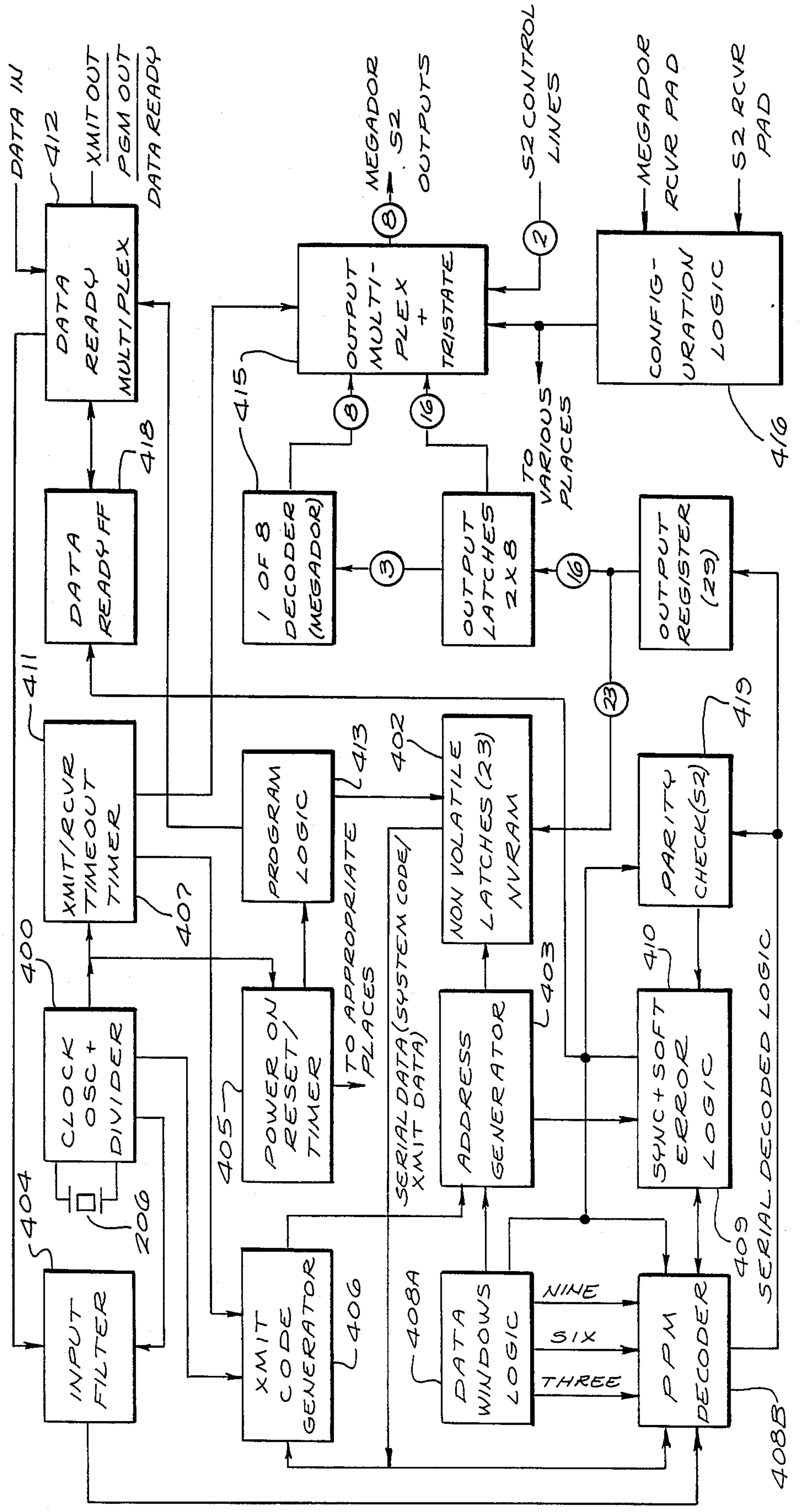
FIG. 4 is a block diagram of an integrated circuit used in the receiver and transmitter units circuits.

FIG. 3 is a schematic diagram of receiver unit 100. At the front end of the receiver are three transistors Q1–Q3 and related components which serve as a regenerative receiver. The output of the regenerative receiver 104 is applied via a comparator 105 to integrated circuit 106. Integrated circuit 106 is responsive on pin 8 to PPM signals detected by the receiver 104 and compares a received PPM signal with the contents of its NVRAM 402 (FIG. 4). If a match occurs, the signals on pins 2 or 3 go high, depending upon which device code is encoded by jumper wires or switches 207 (FIG. 2) in the transmitter unit 200. As previously indicated, eight device codes are possible with the three jumper wires. Only two of the eight possible device codes are both decoded and output with the eight pin version of the integrated circuit 106 shown in FIG. 3. Preferably, integrated circuit 106 also has a fourteen pin version whereat all eight device codes are both decoded and output.

A high signal on pin 2 will turn on switch 107 which includes a transistor Q4. The transistor, in turn, energizes relay RY1 closing the relay's contacts 108 and thus enabling the garage door, gate or electronic lock which the system is controlling to be energized via connector 102.

In the embodiment depicted in FIG. 3, a second channel option is shown with a transistor Q5 and relay RY2 combination 109 which is controlled by pin 3 of IC 106. Thus, if desired, the eight pin version of IC 106 can control up to two devices (garage doors, electrically controlled locks, etc) while the fourteen pin version can control up to eight such devices. Of course, the number of jumper wires and the number of device codes (greater than two) generated thereby is a matter of design choice. Since many homes have two garage doors, the ability of a single receiver to individually control both doors is a cost saving feature. A single transmitter 200 can similarly control a number of devices if it is equipped, for example, with multiple switches each of which energizes the transmitter circuit as does switch S1 and also selects which jumpers 207 are in the circuit of FIG. 2, thereby controlling which device code is generated along with the security code stored in the NVRAM 402 on board IC 300.

The security code stored within the non-volatile NVRAM memory of IC 106 is output on pin 5 and via line 110 to coaxial cable 101 and its miniature jack 103. As has been previously described, the coaxial cable 101 and jack 103 are used to communicate the digital code to one of the hand held transmitter units 200 for the purpose of transferring the digital security code stored in the receiving unit to the transmitter unit 200. Cable 101 is preferably a shielded cable so as to minimize the inadvertent irradiation of the digitally coded signal, which is preferably carried on the center conductor of the cable 101. The shield of cable 101 is effectively grounded at the frequencies at which the digital transfer would normally occur, that is, typically up to one megahertz, by means of inductor 111. The shield of coaxial cable 101 also preferably serves as the antenna for regenerative receiver 101. Those skilled in the art will appreciate that the radio frequency bands allotted in the United States and Canada for such security devices are usually above 70 MHz and preferably in the range of 290–450 MHz. If the shield of coaxial cable 101 is to serve as an antenna, it cannot be effectively grounded at those frequencies. This is done by sizing inductor 111 so that it effectively looks like an open circuit at frequencies above 70 MHz, but yet for the purpose of permitting the transfer of data via connector 103 to a hand held unit 200, inductor 111 is also sized so as to appear electrically like a short circuit at frequencies below one megahertz or so.

Those skilled in the art will appreciate from the foregoing discussion that IC 300 of FIG. 2 and IC 106 of FIG. 3 have some similarities and some differences. In order to reduce the cost of the system, a single semiconductor integrated chip can serve both the application of integrated circuit 300 of FIG. 2 and integrated circuit 106 of FIG. 3, given the similarities of those applications.

BLOCK DIAGRAM AND DETAILED LOGIC DIAGRAMS OF THE INTEGRATED CIRCUIT

A block diagram of the integrated circuit 106, 300 is shown in FIG. 4. A detailed logic diagram can be found at FIGS. *7a–7d* and 8. In order to accommodate the fact that the integrated circuit behaves differently, depending upon whether it is used in the receiver or transmitter application, it is provided with pads which can be bonded during the last phases of chip manufacture for the purpose of selecting its "personality", that is, whether it is to serve in a receiver application or in a transmitter application. Those skilled in the art will appreciate that once the bonding has occurred, the chip is, for all practical intents, permanently configured either to serve in a receiver application or in a transmitter application. However, before bonding, the integrated circuit chips used for IC 300 and IC 106 are indistinguishable from each other.

Integrated circuits 300 and 106 can be implemented on a single chip of silicon using metal oxide silicon (MOS), large scale integration (LSI) techniques. The block diagram of FIG. 4 shows the major functional blocks of the integrated circuit. Corresponding areas on the logic diagrams of FIGS. *7a–7d* are called out with common reference numerals. Certain ones of the blocks are used when the integrated circuit is configured to operate as a transmitter, while others are used when the integrated circuit is configured to operate as a receiver while still others are used in both modes of operation.

Logic Common to Both Modes of Operation

The chip includes a clock oscillator circuit 400 whose frequency is controlled by an external ceramic resonator 206 (FIG. 2) which is connected between pins 6 and 7 of the integrated circuit. The relationship between the pins of the IC 106 and IC 300 and the pads of the integrated circuit chip shown in FIGS. *7a–7d* is set forth in Table I.

The oscillator on the chip drives a divider chain which generates all the clock frequencies required internally on the chip.

A non-volatile memory or NVRAM 402 is preferably implemented by a series of non-volatile latches. Non-volatile latches are preferred since they do not lose the data stored therein when de-energized. Alternatively, low power consuming memory devices, such as CMOS RAMs, could be used, but then the circuit would likely be modified to include a low power mode of operation during which the contents of the memory was maintained. In any event, the memory preferably stores twenty-three bits of data, twenty bits of which are for the security code in the present embodiment.

The disclosed integrated circuit chip has two basic configurations: an "S2" and a "MEG" configuration. For the purposes of the present application, only the "MEG" configuration is of interest. The configuration is selected by appropriately bonding S2 pad and/or the MEG pad depicted on FIG. *7a*. In the MEG configuration, twenty of the twenty-three bits are reserved to store the security code and three bits are reserved for configuration options which will be described subsequently. These three bits (bits 21, 22 and 23) are preferably transmitted from the chip during programming, but they are not compared upon the receipt of an incoming code, since they are used solely to configure the operation of the chip.

Figure 5:
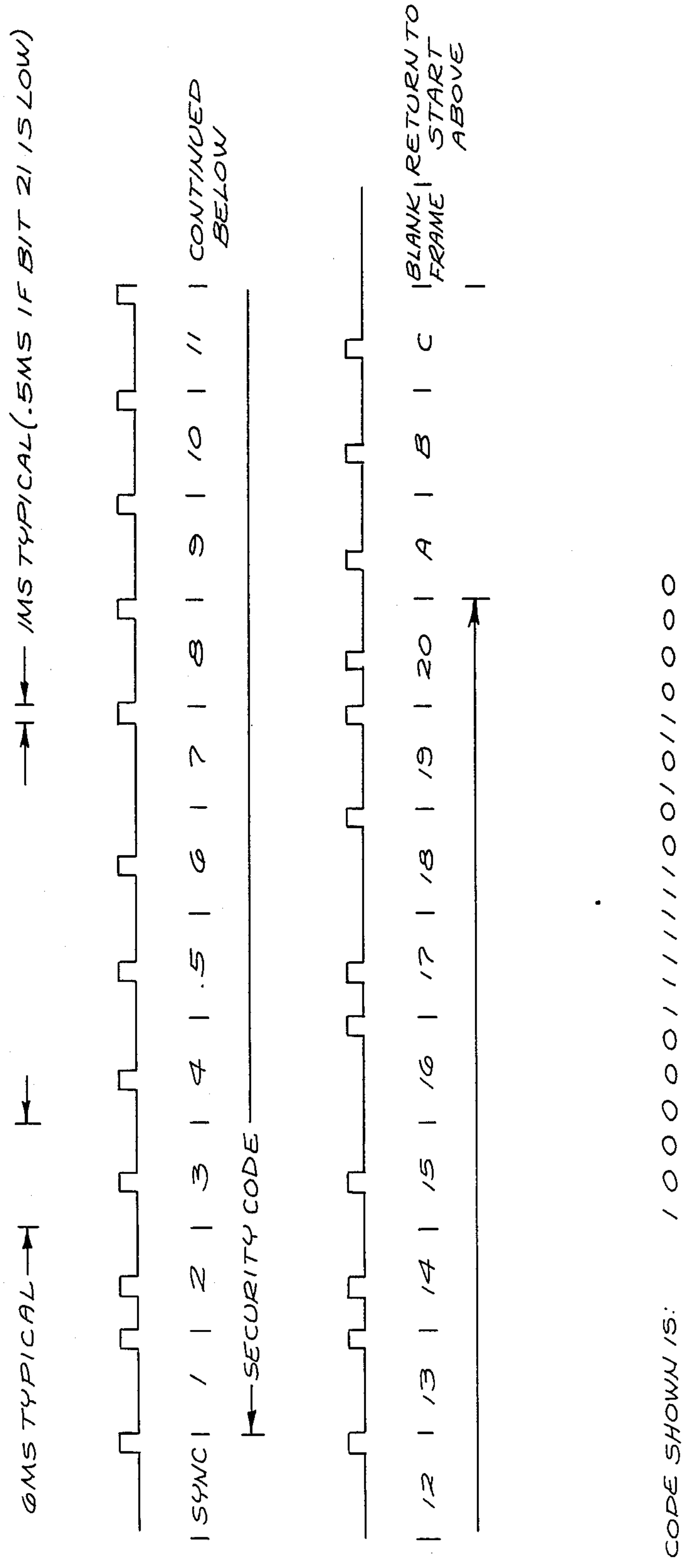
FIG. 5 is a timing diagram of an PPM encoded programming pulse train.

An NVRAM address generator/frame counter 403 sequentially addresses the locations within the NVRAM 402. This address generator 403 is clocked and reset by different signals depending upon the chip configuration. The input filter 404 is preferably arranged to reject all input pulses that are not at least one msec plus or minus 200 microseconds if configuration bit 21 is high or 0.5 msec plus or minus 200 microseconds if configuration bit 21 is low. If the input pulse satisfies the foregoing, the input filter will then output a short pulse time delayed by a constant from the beginning of a valid input pulse. A typical pulse train is shown in FIG. 5. The frames in which the data bits occur are nominally 6 msec wide. If the data bit is a "1" it occurs at the end of a frame and if it is a "0" it occurs near the beginning of a frame.

Power Up Reset (PUR) Timer 405 presets and resets various timers, flip-flops and counters as is conventional in LSI chips.

Figure 8:
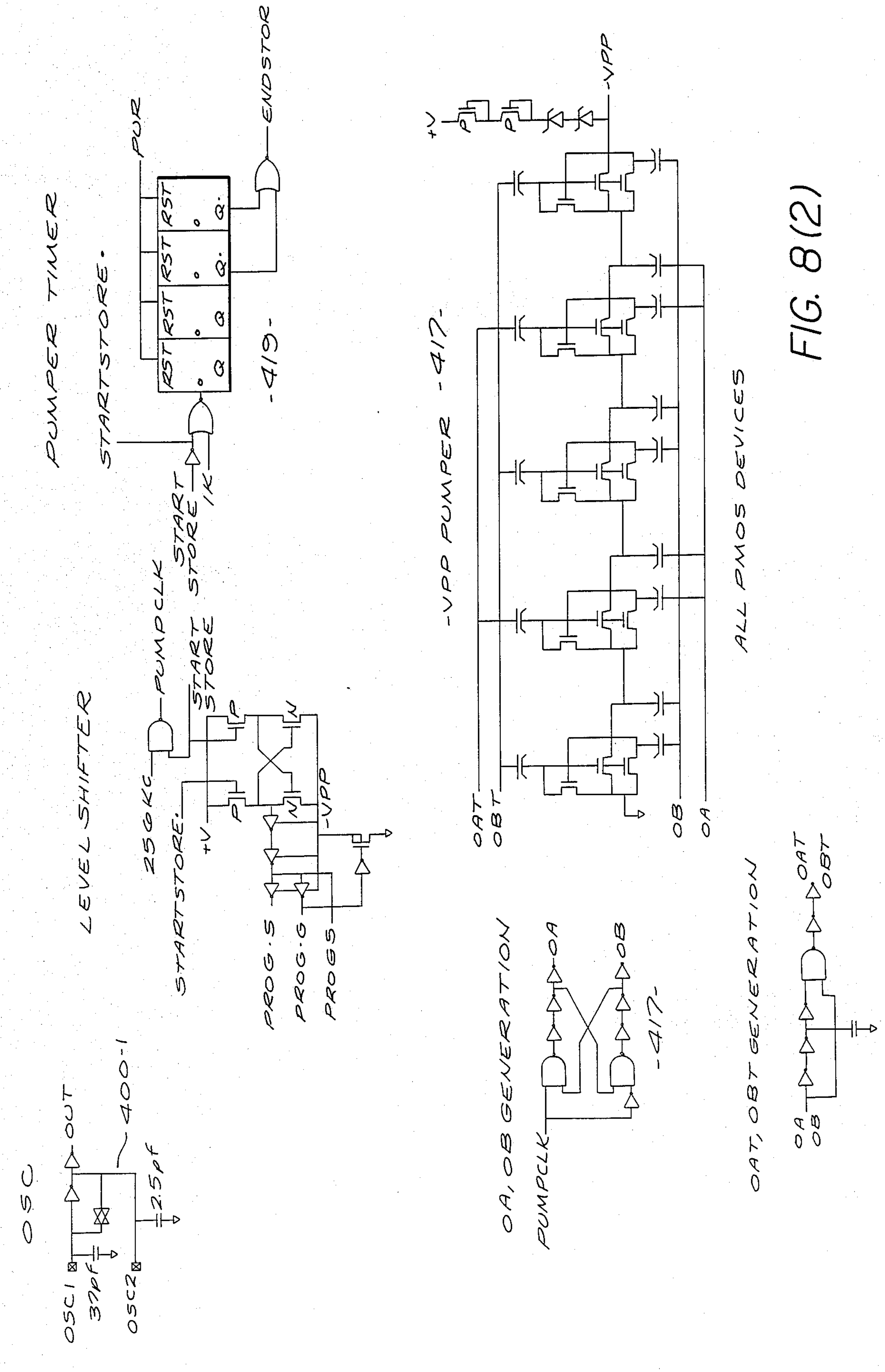
FIG. 8 is a logic diagram of certain functional blocks depicted in FIGS. 7*a*–7*d*.
Figure 8:
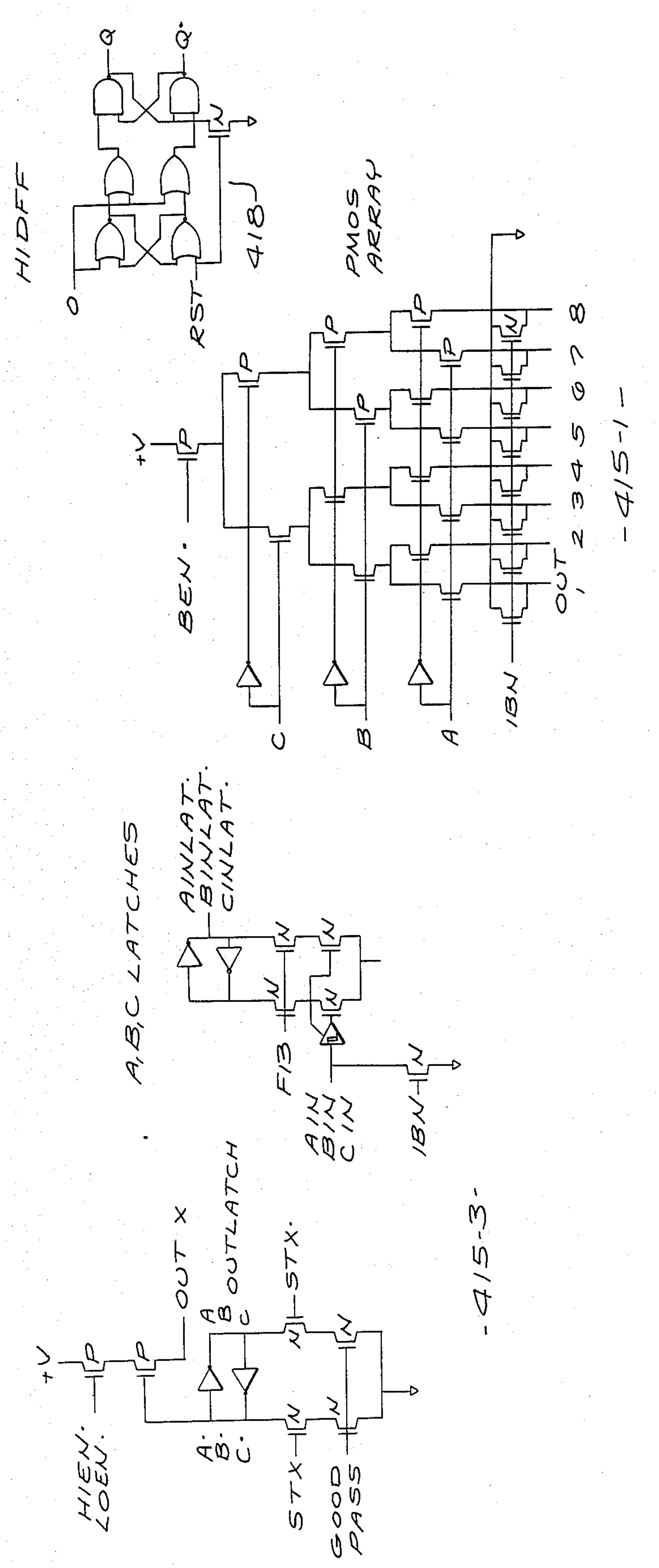

A NVRAM Programming Voltage Pumper 417 is depicted on FIG. 8. The pumper 417 is enabled only after the receipt of a programming word is detected by Programming Logic 413 (FIG. *7b*). The pumper pumps up a voltage $-V_{PP}$ which is necessary to program the NVRAM 402, but which not normally otherwise available on the IC. This is a power consuming function and therefore it is enabled by logic 413 only when needed and it is thereafter shut down by a pumper timer 419 (FIG. 8).

Logic Used During Transmitter Mode of Operation

Code generator 406 encodes and outputs the first twenty bits of data stored in NVRAM 402 and also encodes and outputs the three external input pins (pins 1, 2 and 3 to which the jumpers or switches 207, FIG. 2, are connected). The transmitter time-out timer 407 controls the length of time that the code generator 406 is active. Preferably, configuration bit 23 in NVRAM 402 controls timer 407. If bit 23 is high, timer 407 causes the transmitter to cease transmitting after two seconds of operation (a requirement in Canada). If bit 23 is low, the timer 407 does not affect code generator 406 and the transmitter will transmit continuously (as permitted in the U.S.).

The pulse width generated by code generator 406 is preferably one msec if configuration bit 21 is high and 0.5 msec if configuration bit 21 is low. The position of the leading edge of the transmit pulse is the same irrespective of the pulse width as controlled by configuration bit 21.

Logic Utilized During Receiver Mode of Operation

Figure 6:
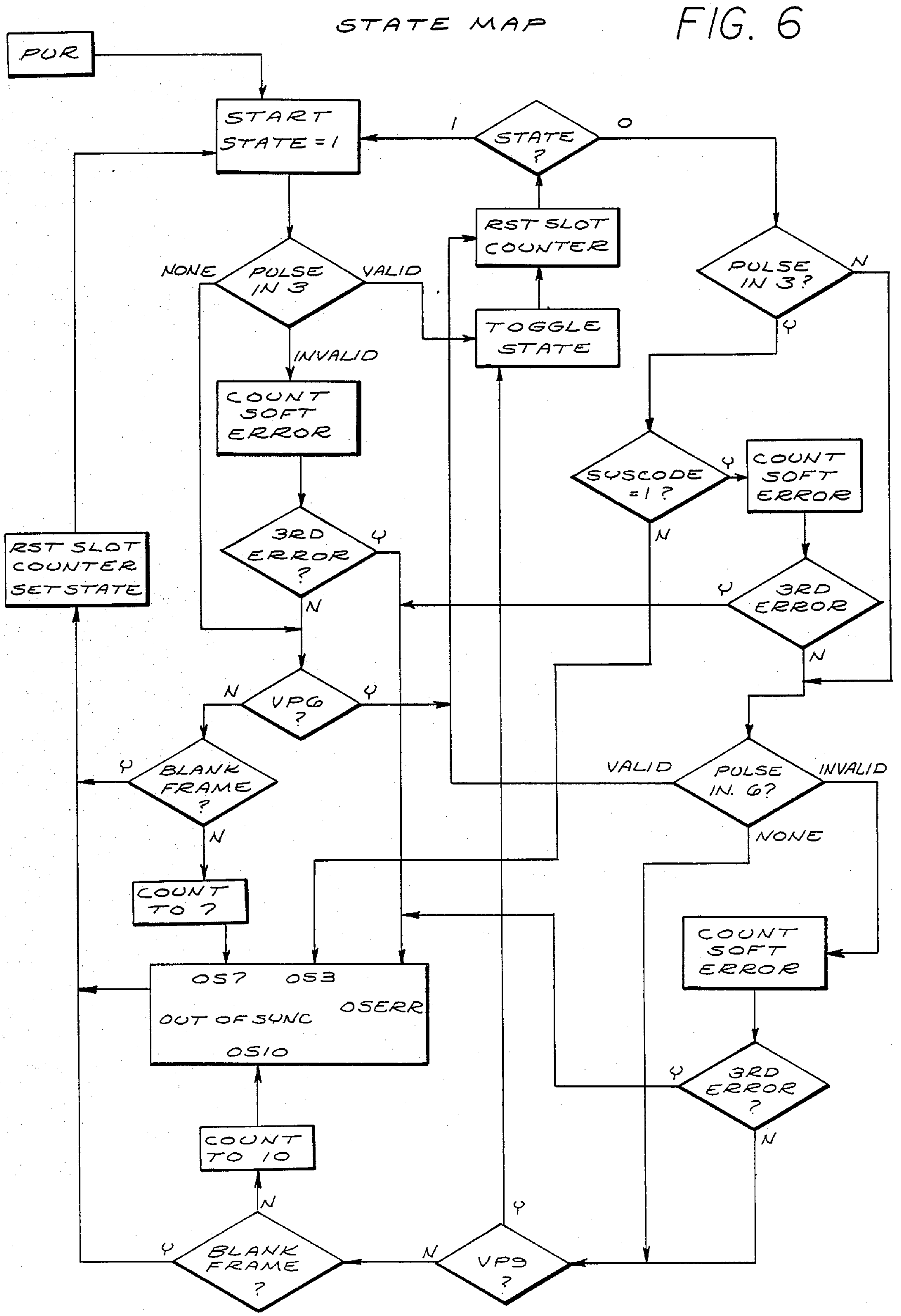
FIG. 6 is a functional block diagram of the state machine embodied in the integrated circuit.

Data Windows Logic 408A and PPM Decoder 408B define a state machine whose logic is defined by the flow diagram of FIG. 6. The operation of the state machine shall depend upon the state of the previous data bit. A sync bit is a frame containing a logical one which precedes the first code frame. After detecting the sync bit, the following data is looked for in data windows which are 0.5 msec wide. If an expected code bit is missed, or both a 1 and a 0 are rceived during a non-security code data frame, such faults are considered "hard" errors which cause the synchronization logic to be reset. This logic compares an incoming pulse train with the security code stored in the NVRAM and, if they match, generates a "GOODPASS" signal which is used by logics on the chip to enable the updating of the contents of the NVRAM (if in a programming mode) or cause the signals on pins 2 or 3 to go high (for an eight pin version of the chip configured as a receiver chip).

"Soft" error logic 409 checks for the occurrence of both a 1 and a 0 during a security code data frame and causes a counter therein to be incremented. If the counter counts three "soft" errors, a signal is generated indicating a "hard" error causing the synchronization logic to be reset. The soft error count is reset upon the receipt of a sync bit.

Synchronization logic 410 looks for the receipt of bits and whenever it is reset, it assumes the first bit received is a sync bit. Thereafter, PPM Decoder 408B is enabled to attempt to decode the following bits. When the PPM decoder 408B is in sync, that is, it is receiving valid data, the sync gap at the end of the data shall enable a sync pulse window of one msec to enable the detection of the sync pulse of a succeeding data word (the one msec sync pulse window is twice as wide as each data window).

Receiver time-out timer 411 is responsive to configuration bit 22 to determine whether the receiver output persists for one-half second (if the configuration bit is low) or two seconds (if the configuration bit is high) after the logic detects a match between a received twenty bit security code and the twenty bit security code stored in NVRAM 402. As can be seen from FIG. 7*c*, timers 407 and 411 share a number of common logic elements.

Whenever the receiver is not in sync, that is, receiving valid one msec pulse widths at input filter 404, it continuously outputs the twenty bits of the security code plus the three bits of the configuration code via multiplexer 412, pin 5 of the I.C. and thence to coaxial cable 101 (See FIG. 3). The programming pulse train outputted on pin 5 when the integrated circuit is configured to act in a receiver application is preferably the inverse of the pulse train generated when the I.C. is configured to act in a transmitter application. This feature serves to protect a transmitter unit 200 from being accidentally programmed by another transmitter unit 200.

The pulse width during programming is preferably set a one msec irrespective of the state of configuration bit 21. Thus, the transmitter units 200 need only be responsive to one type of programming pulse train.

One-of-Eight Decoder/Encoder logic and Output Multiplexer 415 is coupled to pads Q1–Q8 (in the 14 pin receiver IC), pads Q1 & Q2 (in the 8 pin receiver IC) and pads A, B & C (in the transmitter IC). The one of eight decoder shown as a block in FIG. 7*c* is shown in greater detail in FIG. 8. The one of eight decoder decodes the three bits which occur at frame times 21–23 and which provide the encoded device codes discussed previously. (These bits correspond to the bits which are encoded in the transmitter units by selectively coupling pads A, B, & C to $V_{DD}$).

Program Logic

During programming, the programming pulse train is output on a Data Ready pad (FIG. 7*c*) for an IC configured as a receiver and input on the Data Ready pad for an IC configured as a transmitter. In the case of an IC configured as a transmitter, when it is transmitting the code (as opposed to being programmed) it outputs the code on the same pad, namely, the Data Ready pad. In the case of an IC configured as a receiver, when it is receiving code (as opposed to generating the programming code for the transmitter units), the code is received on a Data In pad (FIG. 7*c*).

The transmitting unit to be programmed and the receiver unit to do the programming are coupled together preferably using the jack 103 to connector 203 communication path previously described. Power is then applied to the transmitter unit by depressing pushbutton 201 and holding it down for approximately one half a second, which will be a sufficient time to program the transmitter. The IC includes power up logic 405 which performs certain reset functions when power is initially applied to a chip. The initial resetting functions preferably occur during an initial 16 msec time period subsequent to the initial application of power. Thereafter, during an additional 16 msec time period, program logic 413 determines if valid programming pulses are received during the second 16 msec time period. If so, the program logic 413 places the I.C. into its programming mode and it will preferably stay in that mode until such time as power is removed when the user stops depressing pushbutton 201. If no valid programming pulses are detected during the second 16 msec time period, program logic 413 permits the I.C. to enter its normal mode of operation which, for an I.C. configured as a transmitter, means that it will continually output the code stored in its NVRAM 402 for use in keying the radio frequency transmitter to which it is coupled (see FIG. 2).

Program logic 413 preferably includes a latch which is set after one reprogramming cycle to prevent the continuous reprogramming of the I.C. chip after the initial application of power to the chip. This feature prevents continuous programming of the NVRAM since a typical NVRAM only has a life of about 10,000 programming or memory write cycles.

Since the transmitter units use the same IC as the receiver units (with the configuration differences imposed by the selective bonding of the "MEG" pad discussed subsequently), those skilled in the art will appreciate that it is also possible to program the receiver units with a desired security code by inputting the code into the IC's Data Ready pad immediately after the initial application of electrical power to the IC. In this way, the codes contained in the receiver units can be easily programmed when the receiver units are manufactured. Thereafter, the receiver units can be conveniently used to program the transmitter units in the field (i.e. at a persons home or place of business, etc.). If necessary, the receiver units can also be reprogrammed in the field by applying the programming code to them as discussed above or by connecting two receivers together via their coaxial cables 101 and a suitable female to female connector. In this case, the receiver to be the source of the programming code must be energized before energizing the receiver unit to be programmed with the security code of the source.

Similarly, transmitter units can be used to program each other if a suitable fixture is used to connect them via their programming ports 203. The fixture must effectively invert the programming signal. The transmitter unit to be the source of the programming code must be energized first, followed by the transmitter unit to be programmed. The switches or jumpers 207 of the source unit will program the configuration bits of the transmitter unit to be programmed, so the correct switches or jumpers 207 must be set or closed before the programming is undertaken.

Alternatively, the security code stored in the transmitter units could be generated randomly on board the IC, using known random number generators, in response to the receipt of a programming code. This would make it easy to install a new, unknown and random security code in the receiver unit, should the security ever be breached or should it be the policy of the user to periodically change the security code.

THE STATE MACHINE

The state machine flow diagram of Data Windows Logic 408A and PPM Decoder 408B is shown in FIG. 6. Those skilled in the art will appreciate that with the PPM encoding depicted with respect to FIG. 5, if the most recently detected bit is a one bit (i.e., it appears at the very end of a 6 msec data frame), that the next following bit will occur in 3 msec if it is a logical 0 or in 6 msec if it is a logical 1. The only valid exception to this is the blank frame which immediately occurs before a sync bit in which case no bit occurs at either 3 msec or 6 msec after the currently detected bit. If the most recently detected bit is a logical 0 bit (in which case the machine is said to be in state 0), the following bit can either occur 6 msec later if it is a logical 0 bit or 9 msec later if it is a logical 1 bit. Again, the only exception to this is the blank frame where no bit follows at either 6 or 9 msec following a logical 0 bit. When a blank frame is detected, the state machine is reset to state 1 and it starts sampling for the following sync bit.

As can be seen from the state diagram of FIG. 5, when the machine is in state 1, it is sampling either for bits occurring at 3 or 6 ms following the preceding bit and when in state 0 it samples for bits occurring at 6 or 9 ms following the receiving bit. Bits which are detected at other times cause various error conditions as indicated by the state diagram.

THE LOGIC DIAGRAMS

As previously stated, FIGS. *7a–7d* can be assembled to form a logic diagram for the integrated circuit. Additional logic elements are shown in FIG. 8. The logic diagram includes an option called the "S2" option which has not been previously described in any detail. So long as the S2 pad is not bonded to +V, then the integrated circuit will function in the manner described. The "S2" option permits the integrated circuit of the logic diagram to be used for yet a third function where sixteen data bits accompany a truncated security code, which is used in other applications not important here. The logic which performs this chip configuration as S2 or MEG is shown at numeral 416. The data ready flip-flop 418 is used for the S2 option and therefore has not been described in the written portion of this patent, although it is shown in the accompanying drawings.

TABLE I

| IC Type | Pin Number | Pad |
|---|---|---|
| Transmitter | 1 | A (Q1) |
| | 2 | B (Q3) |
| | 3 | C (Q5) |
| | 4 | $V_{SS}$ |
| | 5 | Data Ready |
| | 6 | OSC 2 |
| | 7 | OSC 1 |
| | 8 | $V_{DD}$ |
| 8 Pin Receiver | 1 | $V_{DD}$ |
| | 2 | Q1 |
| | 3 | Q2 |
| | 4 | $V_{SS}$ |
| | 5 | Data Ready |

TABLE I-continued

| IC Type | Pin Number | Pad |
|---|---|---|
| | 6 | OSC 2 |
| | 7 | OSC 1 |
| | 8 | Data In |
| 14 Pin Receiver | 1 | Q1 |
| | 2 | Q2 |
| | 3 | Q3 |
| | 4 | Q4 |
| | 5 | Q5 |
| | 6 | Q6 |
| | 7 | $V_{SS}$ |
| | 8 | Q7 |
| | 9 | Q8 |
| | 10 | Data Ready |
| | 11 | OSC 2 |
| | 12 | OSC 1 |
| | 13 | Data In |
| | 14 | $V_{DD}$ |

While the invention has been described and illustrated with respect to a preferred embodiment thereof, modification may well suggest itself to those skilled in the art. Thus, it is not intended that the invention be limited to the disclosed embodiment, since many modification and structural changes may be make without departing in any way from the spirit of this invention.

The foregoing will so fully reveal the gist of the invention that others can, by applying current knowledge, readily adapt it for various applications without omitting features that, from the standpoint of the prior art, fairly constitute essential characteristics of the broad and/or specific aspects of this invention.

What is claimed is:

1. An electrically programmable security system comprising:

(a) a receiver responsive to particular radio frequency signals which include a predetermined digital code encoded on the radio frequency signal, said receiver having an antenna for receiving said particular radio frequency signals and said receiver generating a control signal upon detecting the presence of the encoded radio frequency signal, said receiver including means for digitally communicating said predetermined digital code on a coaxial wire communication link, the coaxial wire having a shield which also serves as said antenna; and (b) a transmitter including means for storing a digital code, said transmitter including means for generating a radio frequency signal at a radio frequency to which said receiver is responsive, the radio frequency signal generated by said transmitter being encoded with the digital code stored in said means for storing, said transmitter further including means for coupling with said coaxial wire communication link and means for inputting the predetermined digital code from said receiver unit communicated on said coaxial wire communication link into said means for storing when said communication link is coupled to said coupling means.

2. The security system of claim 1 wherein said inputting means includes power up means responsive to (i) the application of power to said transmitter unit and (ii) the presence of a digital signal communicated over said shielded cable to said coupled means for placing said transmitter into a programming mode of operation during which the means for storing is updated with the digital code communicated on said coaxial wire communication link and further responsive to the non-presence of the digital signal at said coupling means during the application of power for placing said transmitter into a normal mode of operation during which the encoded radio frequency signal is broadcast.

3. The security system of claim 2, wherein said transmitter unit is powered by a series connected battery and pushbutton switch, the pushbutton switch being closed by the user each time the transmitter unit is utilized and wherein said power up means is only capable of placing said transmitter unit into its programming mode during a very short time period after each closure of said pushbutton switch.

4. The security system of claim 1, wherein said inputting means includes means responsive to (i) the application of power to the transmitter unit and (ii) the presence of a digital signal at said coupling means for placing said transmitter into a programming mode of operation during which the means for storing is updated with a digital code communicated on said communication link and further responsive to the non-presence of the digital signal at said coupling means during the application of power for placing said transmitter into a normal mode of operation during which the encoded ratio frequency signal is broadcast.

5. An electrically programmable security system comprising:

(a) a receiver responsive to particular radio frequency signals which include a predetermined digital code encoded on the radio frequency signal, said receiver generating a control signal upon detecting the presence of the encoded radio frequency signal, said receiver including means for digitally communicating said predetermined digital code on a communication link; and (b) a transmitter including non-volatile and updatable memory means for storing a digital code and at least one configuration bit, said transmitter including means for generating a radio frequency signal at a radio frequency to which said receiver is responsive, the radio frequency signal generated by said transmitter being encoded with the digital code stored in said means for storing, said transmitter further including means for coupling with said communication link and means for inputting the predetermined digital code from said receiver unit communicated on said communication link into said means for storing, said inputting means including means responsive to (i) the application of power to said transmitter unit and (ii) the presence of a digital signal at said coupling means for placing said transmitter into a programming mode of operation during which the means for storing is updated with the digital code and said at least one configuration bit communicated on said communication link and further responsive to the non-presence of the digital signal at said coupling means within a short period of item after the application of power for placing said transmitter into a normal mode of operation during which the encoded radio frequency signal is broadcast for a period of time depending upon the state of said at least one configuration bit.

6. The security system of claim 5, wherein said transmitter unit is powered by a series connected battery and pushbutton switch, the pushbutton switch being closed by the user each time the transmitter unit is utilized and wherein said power up means is able to place said transmitter unit into its programming mode only during a very short time period after each closure of said pushbutton switch.

7. The security system of claim 5, wherein said receiver includes means for storing said at least one configuration bit and wherein said at least one configuration bit is communicated over said communication link with said digital code to update the contents of said non-volatile memory with the digital code and the at least one configuration bit stored in said storing means.

8. A security system comprising:

(a) a receiver responsive to particular signals which include a predetermined digital code encoded on the signal, said receiver generating a control signal when the encoded signal is detected;

(b) a transmitter including a non-volatile, updatable memory for storing said predetermined digital code and at least one configuration bit, means responsive to the contents of said memory for generating said signal received by said receiver, and a timer for controlling the length of time which said generating means generates said signal, said timer being responsive to the state of said at least one configuration bit for controlling the length of time which said timer permits said signal to be generated.

9. The security system of claim 8 wherein said receiver includes means for storing said predetermined digital code and for storing said at least one configuration bit, and means for communicating said digital code and said at least one configuration bit over a communication link and wherein said transmitter includes means responsive to said communication link for updating the contents of said non-volatile memory with the digital code and the at least one configuration bit stored in said storing means.

10. A security system code transmitter for use with a receiver with is responsive to a signal which includes a predetermined digital code encoded on the signal, said transmitter comprising:

(a) a non-volatile memory for storing said predetermined digital code and at least one configuration bit, (b) means responsive to the contents of said memory for generating the signal received by the receiver, and (c) means responsive to the state of said at least one configuration bit for controlling said generating means to generate the signal in a selected one of a plurality of different code formats.

11. The transmitter of claim 10 wherein said controlling means controls the period of said digital code.

12. The transmitter of claim 10 wherein said controlling means controls the period said generating means is active.

13. The transmitter of claim 10 wherein the different formats adapt the transmitter to be used in more than one nation.

14. An integrated circuit for use in a security system, said integrated circuit comprising:

(a) non-volatile updatable memory means for storing a digital code and at least one configuration bit;

(b) means for communicating said digital code externally of said integrated circuit in a format dependent upon the state of said configuration bit; and (c) means for receiving a digital code and said at least one configuration bit from an external source and for replacing the contents of said memory with the received digital code and the received configuration bit.

15. The integrated circuit of claim 14 wherein said timer means is responsive to the application of electrical power to said integrated circuit for disabling the second mentioned receiving means a given time after the application of power to said integrated circuit.

16. The integrated circuit of claim 14 including means for detecting the presence of a proper digital code complying with predetermined format characteristics, voltage pumper means developing a higher voltage than is normally used to power the devices on the integrated circuit, said higher voltage being required by said memory to replace the contents thereof, and means responsive to said detecting means for enabling said voltage pumper means only after detecting said proper digital code.

17. The integrated circuit of claim 14 including means for detecting the presence of a proper digital code complying with predetermined format characteristics, said detecting means being effective to enable said second mentioned means to automatically replace to contents of said memory.

18. A method of programming a security system, said method comprising the steps of:

(a) providing a receiver unit which is responsive to a digitally encoded signal and having means for storing the digital code therein;

(b) providing a transmitter unit which transmits the digitally encoded signal and having means for storing the digital code therein;

(c) continuously communicating the digital code stored in the storing means of the receiver unit over a coaxial communication link, said coaxial communication link having a shield which serves as an antenna for said receiver unit;

(d) coupling said transmitter unit to said coaxial link; and (e) updating the contents of the storing means of the transmitter unit with the digital code communicated over the communication link.

19. The method of claim 18 wherein said updating step includes the steps of pumping a higher than normal voltage otherwise available in said transmitter unit in response to the receipt of said digital code and stopping said pumping step after the digital code has been updated in the storing means of the transmitter unit.

20. A method of operating and updating a memory used to store a digital code and at least a configuration bit on an integrated circuit, said method comprising the steps of:

(a) communicating said digital code externally of said integrated circuit;

(b) receiving a digital code from an external source and comparing the received digital code with the contents of said memory;

(c) receiving an updated digital code from an external source;

(d) replacing the contents of said memory with the received digital code and said configuration bit;

(e) timing each application of electrical power to said integrated circuit;

(f) enabling and disabling said replacing step during a predetermined time period after each application of electrical power to said integrated; and (g) communicating said digital code after step (f) for a period of time the length of which is controlled by the state of said at least one configuration bit.

* * * * *